(No Model.)
W. J. YOUNG.
TIRE TIGHTENER.
No. 489,404. Patented Jan. 3, 1893.
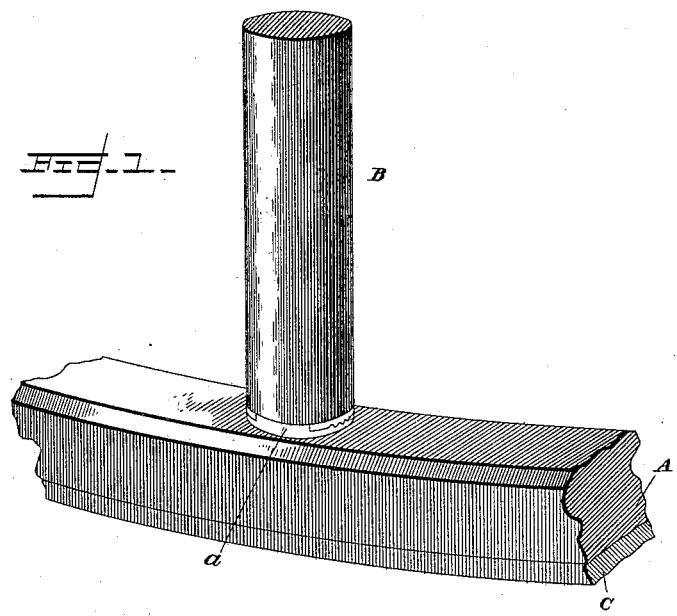
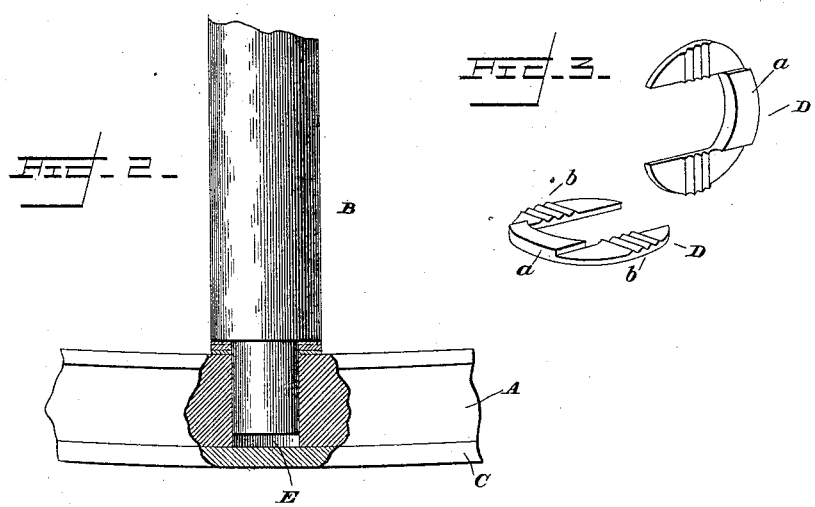
Witnesses
Edw. S. Duvall Jr.
Wm. L. Boyden
Inventor
William J. Young
per Fred L. Tasker
Attorney

United States Patent Office.

WILLIAM J. YOUNG, OF TOWN CREEK, ALABAMA, ASSIGNOR OF ONE-HALF TO JOSEPH M. HOUSTON, OF SAME PLACE.

TIRE-TIGHTENER.

SPECIFICATION forming part of Letters Patent No. 489,404, dated January 3, 1893.

Application filed June 23, 1892. Serial No. 437,758. (No model.)

*To all whom it may concern:*

Be it known that I, WILLIAM J. YOUNG, a citizen of the United States, residing at Town Creek, in the county of Lawrence and State of Alabama, have invented certain new and useful Improvements in Tire-Tighteners; and I do hereby declare the following to be a full, clear, and exact description of the invention, such as will enable others skilled in the art to which it appertains to make and use the same.

My present invention relates to an improvement in tire-tighteners, the object of the invention being to provide a simple, cheap, efficient and easily-constructed device for tightening the tires of wagons or other vehicle wheels without removing the tire from the wheel, and the invention consists essentially in the construction, arrangement and combination of parts, substantially as will be hereinafter described and then more particularly pointed out in the appended claims.

In the accompanying drawings illustrating my invention: Figure 1 is a perspective view of a portion of a wheel rim and spoke, with my improved tire tightener, applied thereto. Fig. 2 is a sectional detail elevation of the same. Fig. 3 is a perspective view of the device.

Similar letters of reference designate corresponding parts in the several figures of the drawings.

In Figs. 1 and 2, A represents a portion of a wheel, which is made of wood or other suitable material, having the spokes B, and being provided with a tire C. I simply illustrate these parts to show the manner of applying my invention.

Whenever for any reason the tire becomes loose upon the wheel rim, it is necessary to provide some means whereby the latter may be made to resume its former position in close contact with the said tire. My invention aims to accomplish this in the manner hereinafter described.

In Fig. 3 I have delineated my improved tire tightener in detail. It consists of the two plates or washers D D which are substantial duplicates of each other. Each plate or washer is of a substantially U-shaped form, its inner periphery being U-shaped, while its outer periphery forms a portion of the circumference of a circle so that when the two washers are located in reverse position upon each other in practical operation, in the manner shown in Fig. 1, they will form a complete circle upon their outer and inner peripheries.

Each plate or washer is provided with a lug or raised portion $a$ at its inner end which is of about the same length as the distance between the open ends of the plate so that when the two plates are in proper position upon each other, the lug will fit neatly between the ends of the other plate as shown in Fig. 1. The lug is of sufficient thickness and of a width equal to the width of the plate at that point. On the same side of the plate on which the lug is formed are the projections or corrugations $b\ b$, arranged in a small series on each arm of the plate, near the middle portion thereof, said corrugations being of sufficient size to suit the purpose for which they are intended, namely, to lock the plates in position upon each other and keep them from slipping out of place. They are of the same length as the width of the arm at the point where they are located, but may be made shorter if desired.

The manner of securing the washers in position is as follows: When a tire becomes loose and it is desired to apply my invention thereto, the spoke, as B, is raised out of the socket E in the wheel rim A, a sufficient distance by any suitable means, to allow of one of the plates being placed between the shoulder of the spoke and the wheel rim. The other plate D is then slid upon the first plate in a reverse position the U-shaped ends of both plates coming into coincidence with each other in the manner shown in Fig. 1 and when the shoulder of the spoke is pressed down upon them, the projecting corrugations on one plate will enter the depressed portions of the corrugations on the other plate, thus securely interlocking the plates and preventing them from slipping apart. It is designed to make these washers or plates D of cast iron, the whole device being forged in one piece and of any size and thickness, but it is manifest that they may be made of any other metal or material and the form of the same may vary from that herein shown without departing from my invention, and I reserve the liberty of varying their construction to suit the exigencies of different cases.

Having thus described my invention, what I claim as new and desire to secure by Letters-Patent, is:

1. A tire tightener consisting of two substantially U-shaped washers or plates, both of which are constructed substantially alike, each plate being provided with a lug or raised portion at its inner end which is of sufficient length to lie between the outer ends of its companion plate when the said plates are located in reverse position upon each other, substantially as described.

2. The herein described tire tightener consisting of the two plates which are adapted to lie upon each other in reverse position, each plate being of a substantially U-shaped form and being provided at its inner end with a lug which is adapted to lie between the outer ends of the opposite plate, and with a series of corrugations upon the same side of the plate as that upon which the lug is located so that when the plates are in proper position the corrugations will engage each other and interlock the plates, substantially as described.

3. The herein-described tire tightener, consisting of the two U-shaped plates or washers D D which are substantially alike, having the raised portions or lugs $a$ $a$ at their inner ends, substantially as described.

4. The herein-described tire tightener consisting of the two substantially U-shaped plates or washers D D, having the lugs $a$ $a$ at their inner ends and the series of corrugations $b$ $b$ located upon the same side of the plate as the lugs $a$, substantially as described.

In testimony whereof I affix my signature in presence of two witnesses.

WILLIAM J. YOUNG.

Witnesses:
J. R. ARMSTRONG,
E. M. ODOM.